(12) United States Patent
Wang et al.

(10) Patent No.: US 8,122,313 B2
(45) Date of Patent: Feb. 21, 2012

(54) ACKNOWLEDGMENT PACKET

(75) Inventors: Xiaoyi Wang, Beijing (CN); Shashikant Maheshwari, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 807 days.

(21) Appl. No.: 12/246,475

(22) Filed: Oct. 6, 2008

(65) Prior Publication Data

US 2009/0150737 A1    Jun. 11, 2009

Related U.S. Application Data

(60) Provisional application No. 60/978,403, filed on Oct. 8, 2007.

(51) Int. Cl.
*H04L 1/14* (2006.01)

(52) U.S. Cl. ........................................ 714/750; 714/749

(58) Field of Classification Search .................... 710/52; 370/392, 338, 468; 726/13; 714/748, 750, 714/749
See application file for complete search history.

(56) References Cited

U.S. PATENT DOCUMENTS

| | | | |
|---|---|---|---|
| 7,133,943 B2 * | 11/2006 | Carnevale et al. | 710/52 |
| 7,720,070 B1 * | 5/2010 | Li | 370/392 |
| 2006/0062192 A1 * | 3/2006 | Payne, III | 370/338 |
| 2006/0062250 A1 * | 3/2006 | Payne, III | 370/468 |
| 2006/0075481 A1 * | 4/2006 | Ross et al. | 726/13 |
| 2007/0277073 A1 * | 11/2007 | Zegers et al. | 714/748 |

OTHER PUBLICATIONS

IEEE 802.16-2004, "IEEE Standard for Local and Metropolitan Area Networks—Part 16: Air Interface for Fixed Broadband Wireless Access Systems", (2004).
IEEE 802.16E-2005, "IEEE Standard for Local and Metropolitan Area Networks—Part 16: Air Interface for Fixed and Mobile Broadband Wireless Access Systems", (Feb. 28, 2006.).
Cudak, Mark "Draft IEEE 802.16m Requirements", IEEE C802.16m-07/002r1, IEEE 802.16 Broadband Wireless Access Working Group,(Mar. 15, 2007),34 Pages.

* cited by examiner

*Primary Examiner* — David Ton
(74) *Attorney, Agent, or Firm* — Brake Hughes Bellermann LLP (57) ABSTRACT

Various example embodiments are disclosed. According to an example embodiment, a receiving station in a wireless network may receive a plurality of Medium Access Control Packet Data Units (MPDUs) from a transmitting station. Each of the plurality of MPDUs may include a sequence number. The receiving station may also determine which of the plurality of MPDUs were successfully or not successfully received from the transmitting station. The receiving station may also transmit, to the transmitting station, at least one automatic repeat request (ARQ) feedback information element (IE). The at least one ARQ feedback IE may include a number of acknowledgment maps field indicating a number of acknowledgment maps included in the ARQ feedback IE and the indicated number of acknowledgment maps. Each of the acknowledgment maps may include a sequence format field indicating a number of block sequence fields and the indicated number of block sequence fields. Each of the block sequence fields may indicate a sequence length of successive packets which were successfully or not successfully received based on the determining which of the plurality of received MPDUs were successfully received from the transmitting station.

20 Claims, 7 Drawing Sheets

ACKNOWLEDGMENT PACKET

PRIORITY CLAIM

This application claims the benefit of priority based on U.S. Provisional Application No. 60/978,403, filed on Oct. 8, 2007, entitled, "Acknowledgement Packet," the disclosure of which is hereby incorporated by reference.

TECHNICAL FIELD

This description relates to wireless networks.

BACKGROUND

When wireless stations, such as base stations or mobile stations, communicate, a transmitting station may send a plurality of data packets to a receiving station. The receiving station may acknowledge or negatively acknowledge receipt of the data packets.

SUMMARY

According to one general aspect, a receiving station in a wireless network may receive a plurality of Medium Access Control Packet Data Units (MPDUs) from a transmitting station. Each of the plurality of MPDUs may include a sequence number. The receiving station may also determine which of the plurality of MPDUs were successfully or not successfully received from the transmitting station. The receiving station may also transmit, to the transmitting station, at least one automatic repeat request (ARQ) feedback information element (IE). The at least one ARQ feedback IE may include a number of acknowledgment maps field indicating a number of acknowledgment maps included in the ARQ feedback IE and the indicated number of acknowledgment maps. Each of the acknowledgment maps may include a sequence format field, such as a two-bit sequence format field, indicating a number of block sequence fields, and may include the indicated number of block sequence fields. Each of the block sequence fields may indicate a sequence length of successive packets which were successfully or not successfully received based on the determining which of the plurality of received MPDUs were successfully received from the transmitting station.

According to another general aspect, a receiving station in a wireless network may receive a plurality of Medium Access Control Packet Data Units (MPDUs) from a transmitting station. Each of the plurality of MPDUs may include a sequence number. The receiving station may also determine which of the plurality of MPDUs were successfully or not successfully received from the transmitting station. The receiving station may also transmit, to the transmitting station, at least one automatic repeat request (ARQ) feedback information element (IE). The at least one ARQ feedback IE may include a number of acknowledgment maps field indicating a number of acknowledgment maps included in the ARQ feedback IE and the indicated number of acknowledgment maps. Each of the acknowledgment maps may include a sequence format field, such as a three-bit sequence format field, indicating a number of block sequence fields, and may include the indicated number of block sequence fields. Each of the block sequence fields may indicate a sequence length of successive packets which were successfully or not successfully received based on the determining which of the plurality of received MPDUs were successfully received from the transmitting station.

According to another general aspect, a receiving station in a wireless network may receive a plurality of Medium Access Control Packet Data Units (MPDUs) from a transmitting station. Each of the plurality of MPDUs may include a sequence number. The receiving station may also determine which of the plurality of MPDUs were successfully or not successfully received from the transmitting station. The receiving station may also transmit, to the transmitting station, at least one automatic repeat request (ARQ) feedback information element (IE). The at least one ARQ feedback IE may include an acknowledgment type field, a number of acknowledgment maps field, and the indicated number of acknowledgment maps. The acknowledgment type field may indicate a type of the ARQ feedback IE as either a cumulative acknowledgment entry or a cumulative acknowledgment with enhanced block sequence acknowledgment entry. The number of acknowledgment maps field may indicate the type of the ARQ feedback IE as the cumulative acknowledgment with enhanced block sequence acknowledgment entry, and further indicate a number of acknowledgment maps included in the ARQ feedback IE. Each of the acknowledgment maps may include a sequence format field, such as a two-bit sequence format field, indicating a number of block sequence fields, and may include the indicated number of block sequence fields. Each of the block sequence fields may indicate a sequence length of successive packets which were successfully or not successfully received based on the determining which of the plurality of received MPDUs were successfully received from the transmitting station.

According to another general aspect, a receiving station in a wireless network may receive a plurality of Medium Access Control Packet Data Units (MPDUs) from a transmitting station. Each of the plurality of MPDUs may include a sequence number. The receiving station may also determine which of the plurality of MPDUs were successfully or not successfully received from the transmitting station. The receiving station may also transmit, to the transmitting station, at least one automatic repeat request (ARQ) feedback information element (IE). The at least one ARQ feedback IE may include a number of acknowledgment maps field indicating a number of acknowledgment maps included in the ARQ feedback IE and the indicated number of acknowledgment maps. Each of the acknowledgment maps may include a sequence format field, such as a two-bit sequence format field, indicating a number of block sequence fields, and may include the indicated number of block sequence fields. Each of the block sequence fields may indicate a sequence length of successive packets which were successfully or not successfully received based on the determining which of the plurality of received MPDUs were successfully received from the transmitting station.

The details of one or more implementations are set forth in the accompanying drawings and the description below. Other features will be apparent from the description and drawings, and from the claims.

DETAILED DESCRIPTION

Figure 1:
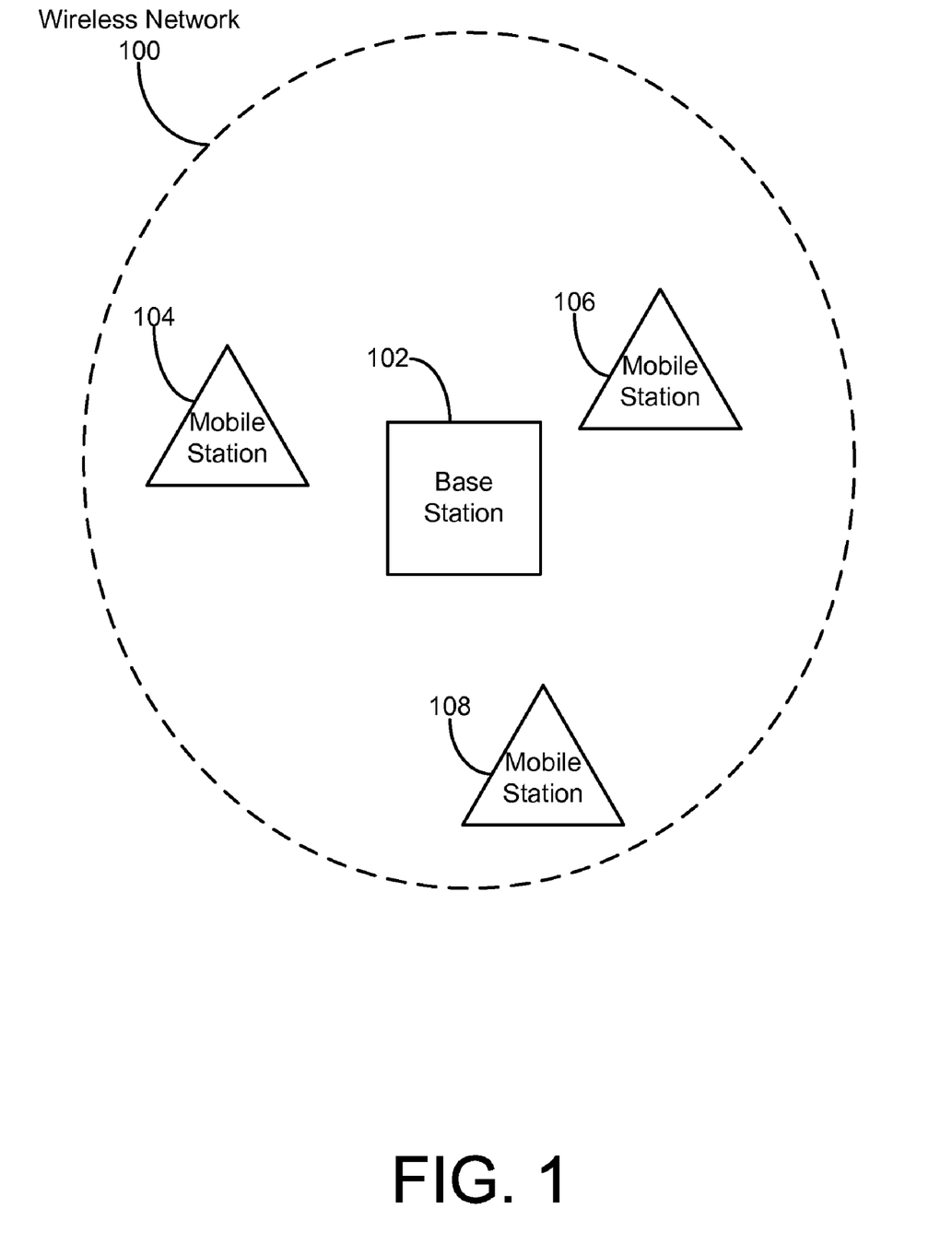
FIG. 1 is a block diagram of a wireless network according to an example embodiment.

FIG. 1 is a block diagram of a wireless network 100 according to an example embodiment. The wireless network 100 may include, for example, an IEEE 802.16 wireless metropolitan area network (WiMAX), an IEEE 802.11 wireless local area network (WLAN), or a cellular telephone network, according to example embodiments. The wireless network 100 may include, for example, a base station 102 and any number of mobile stations 104, 106, 108. The base station 102 may include, for example, access points (APs), cellular base stations, or node Bs, according to example embodiments. The mobile stations 104, 106, 108 may include, for example, laptop or notebook computers, personal digital assistants (PDAs), smartphones, and/or a cellular telephones, according to example embodiments. The mobile stations 104, 106, 108 may receive data and/or voice service from the base station 102.

The mobile stations 104, 106, 108 may transmit and receive data from the base station 102 using, for example, time division duplexing (TDD) or frequency division duplexing (TDD), in either full or half-duplex mode. The mobile stations 104, 106, 108 may communicate with the base station 102 using, for example, orthogonal frequency division multiple access (OFDMA), by modulating data onto a plurality of carriers, such as 256 subcarriers, according to an example embodiment. The data may be modulated onto the subcarriers using, for example, quadrature amplitude modulation (QAM) such as 64-QAM or 16-QAM, quadrature phase shift keying (QPSK), or binary phase shift keying (BPSK), according to example embodiments. A carrier frequency of approximately 2.5 Gigahertz and/or 3.5 Gigahertz may be used, with bandwidth allocations of 1.25 to 20 Megahertz, such as about 10 Megahertz bandwidth allocations. The subcarriers may, for example, be separated by about 10 kilohertz. For example, in a 10 Megahertz band, one channel may include 48 subcarriers for data. The data may be arranged into packets, such as MAC packet data units (MPDUs, shown in FIG. 4), according to an example embodiment.

In communicating with each other, the base station 102 and mobile stations 104, 106, 108 may send a plurality of data packets such as MPDUs to each other, and may acknowledge (ACK) or negatively acknowledge (NAK) MPDUs which were successfully or not successfully received, respectively. Each MPDU may include a block sequence number, such as a sequence number of a payload (shown in FIG. 4). The recipient of the plurality of data packets, which may include a base station 102 or mobile station 104, 106, 108, may ACK or NAK the plurality of MPDUs based on the sequence numbers of the MPDUs, according to an example embodiment. The recipient may, for example, ACK or NAK the plurality of MPDUs by sending an automatic repeat request (ARQ) feedback information element (IE) (shown in FIG. 5) to the station which transmitted the plurality of MPDUs, which may have been a base station 102 or mobile station 104, 106, 108.

Figure 2:
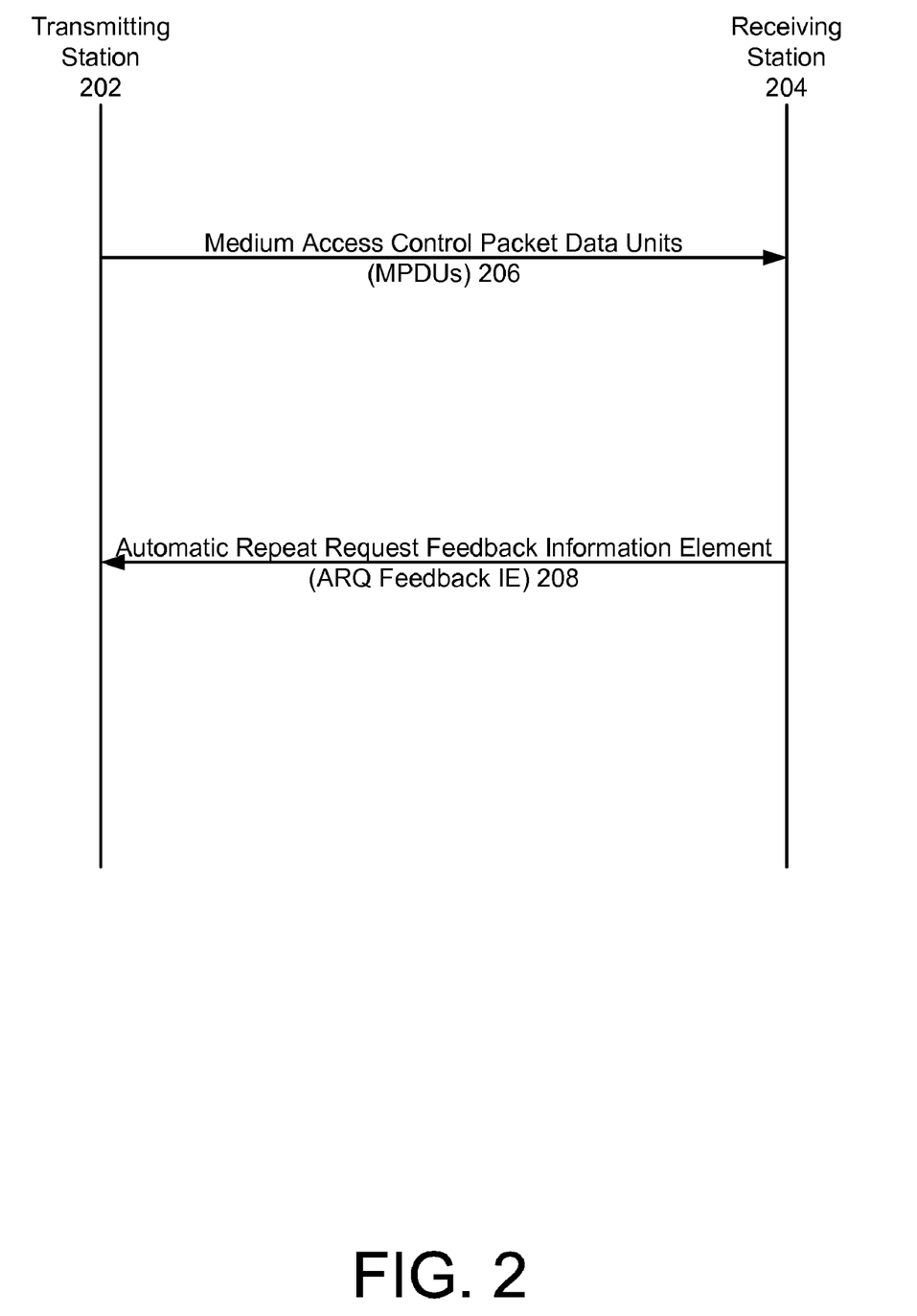
FIG. 2 vertical-time sequence diagram showing a transmitting station transmit a plurality of Medium Access Control Packet Data Units (MPDUs) to a receiving station, and the receiving station transmit an automatic repeat request (ARQ) feedback information element (IE) to the transmitting station.

FIG. 2 vertical-time sequence diagram showing a transmitting station 202 transmit a plurality of Medium Access Control Packet Data Units (MPDUs) 206 to a receiving station 204, and the receiving station 204 transmit an automatic repeat request (ARQ) feedback information element (IE) 208 to the transmitting station 202. The transmitting station 202 may, for example, include a base station 102 or a mobile station 104, 106, 108. The receiving station 204 may also include a base station 102 or a mobile station 104, 106, 108. In an example embodiment, the transmitting station 202 may include a base station 102 and the receiving station 204 may include a mobile station 104, 106, 108, or the transmitting station 202 may include a mobile station 104, 106, 108 and the receiving station 204 may include a base station.

The transmitting station 202 may transmit the plurality of MPDUs 206 to the receiving station 204. Each of the plurality of MPDUs 206 may include a sequence number. The sequence number may be used for ACK/NAK purposes to determine which MPDUs should be retransmitted. The receiving station 204 may receive the plurality of MPDUs 206, which may each include a sequence number, from the transmitting station 202.

The receiving station 204 may determine which of the plurality of MPDUs 206 were successfully or not successfully received from the transmitting station 202. The receiving station 204 may, for example, generate a feedback sequence based on the determining which of the plurality of MPDUs 206 were successfully or not successfully received from the transmitting station 202.

Figure 3:
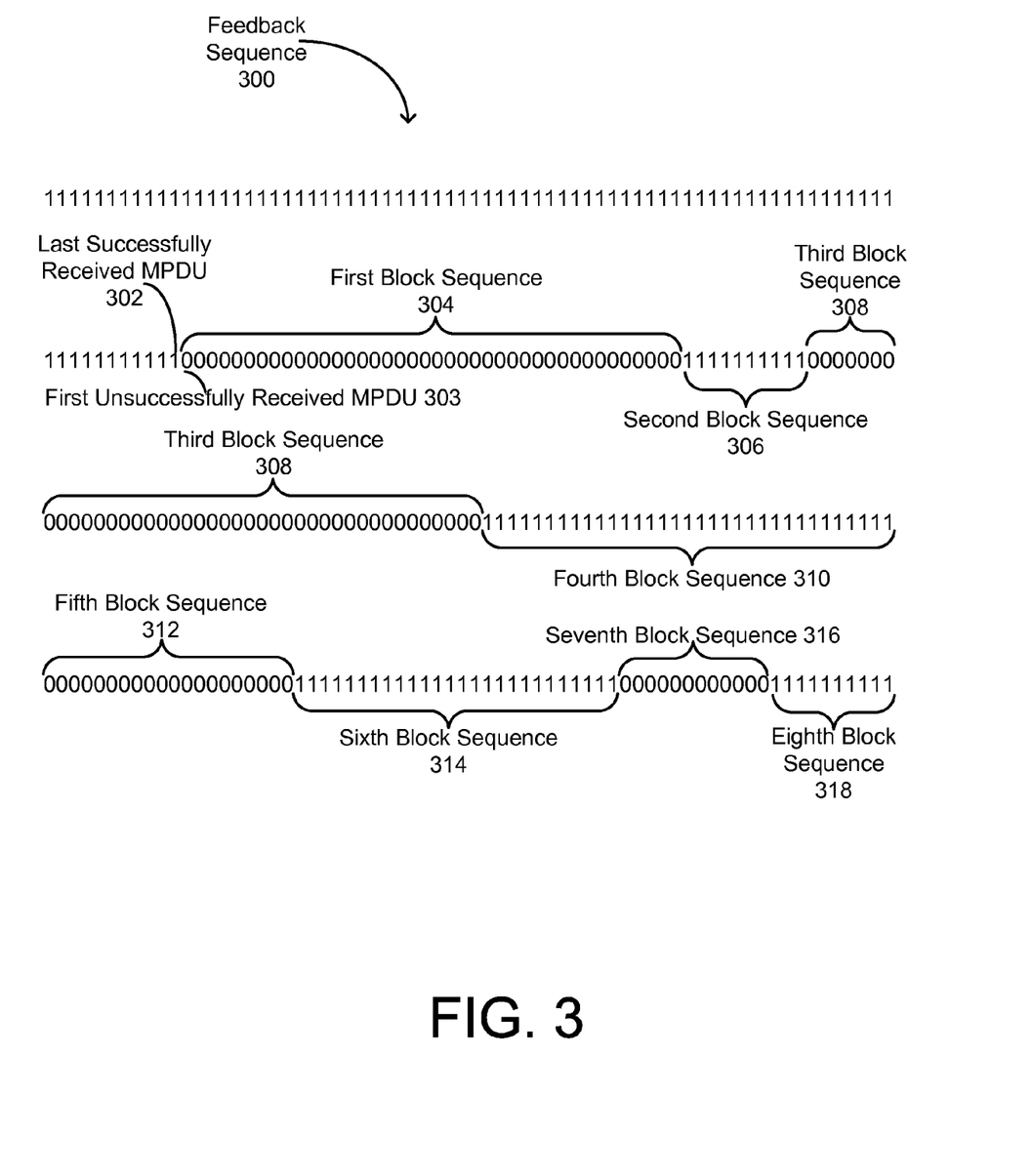
FIG. 3 is a diagram showing a feedback sequence according to an example embodiment.

FIG. 3 is a diagram showing a feedback sequence 300 according to an example embodiment. In this example, the '1's may represent MPDUs which were successfully received, and the '0's may represent MPDUs which were not successfully received.

The receiving station 204 may, for example, determine a block sequence number of a last successfully received MPDU 302. The last successfully received MPDU 302 may, for example, be the last successfully received MPDU 302 before the first unsuccessfully received MPDU 303. The receiving station 204 may also determine one or more sequence lengths of successive packets, such as MPDUs, which were successfully or not successfully received, based on the determining which of the plurality of received MPDUs 206 were successfully or not successfully received. For example, the first block sequence length 304 of successive packets may represent successive MPDUs 206 which were not successfully received, and the following block sequences may alternately represent successive MPDUs 206 which were successfully received and not successfully received. In the example shown in FIG. 3, the first block sequence 304 represents MPDUs 206 which were not successfully received, the second block sequence 306 represents MPDUs 206 which were successfully received, the third block sequence 308 represents MPDUs 206 which were not successfully received, the fourth block sequence 310 represents MPDUs 206 which were successfully received, the fifth block sequence 312 represents MPDUs 206 which were not successfully received, the sixth block sequence 314 represents MPDUs 206 which were successfully received, the seventh block sequence 316 represents MPDUs 206 which were not successfully received, and the eighth block sequence 318 represents MPDUs 206 which were successfully received. Any number of block sequences may be determined based on receiving a plurality of MPDUs 206.

Based on determining which of the plurality of MPDUs 206 were successfully received or not successfully received from the transmitting station 202, the receiving station 204 may transmit, to the transmitting station 202, at least one automatic repeat request (ARQ) feedback information element (IE) 208 to the transmitting station 202. The receiving station 204 may, according to an example embodiment, transmit as many ARQ feedback ILEs 208 to the transmitting station 202 as needed to indicate whether any or all of the MPDUs 206 were successfully received. The ARQ feedback IE 208 may be included in an MPDU, such as in a payload of an MPDU.

Figure 4:
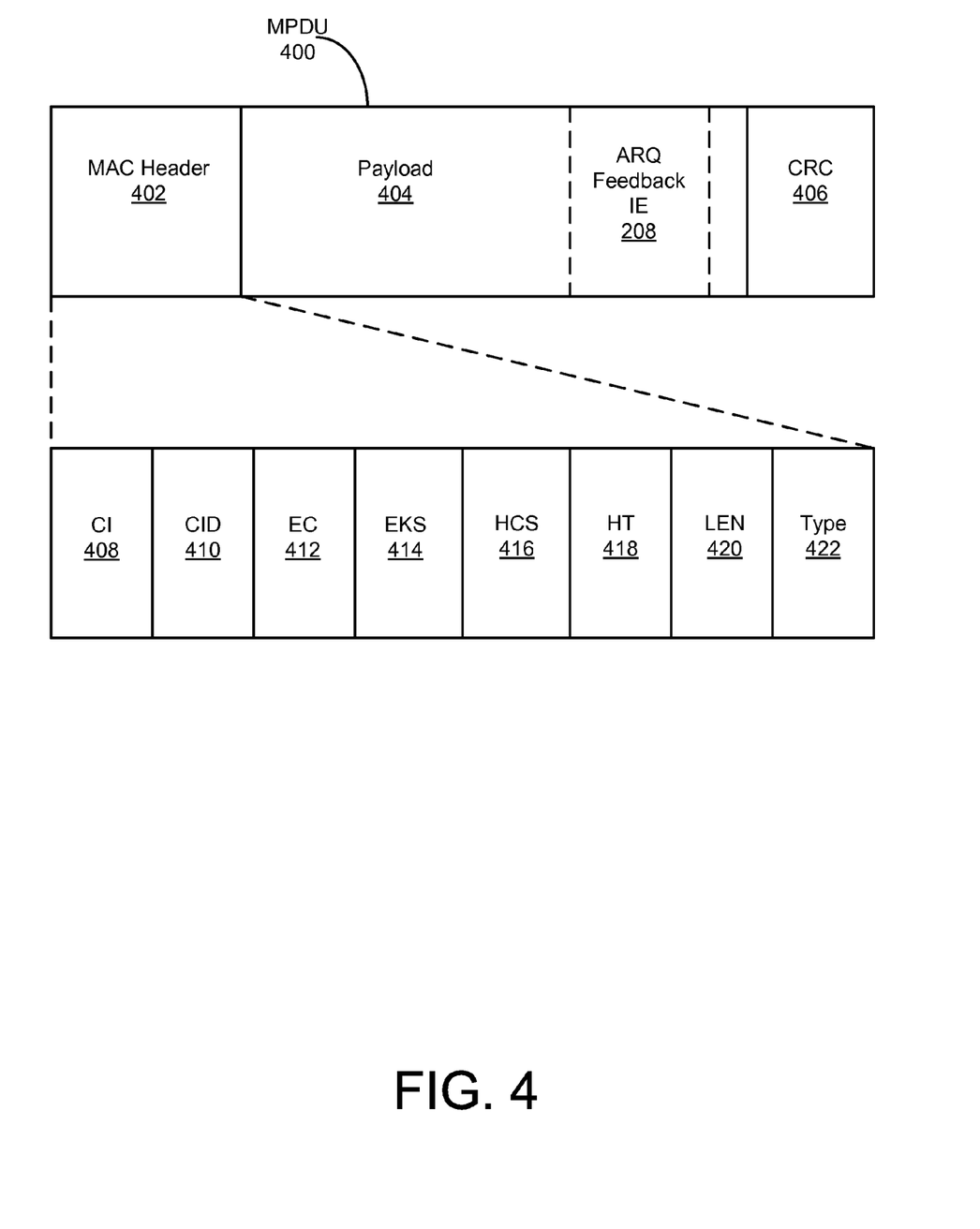
FIG. 4 is a block diagram showing a MPDU according to an example embodiment.

FIG. 4 is a block diagram showing an MPDU 400 according to an example embodiment. In this example, the MPDU 400 may include a MAC header 402, a payload 404 which may include data and/or the ARQ feedback IE 208, and may include a CRC 406 which may include a cyclic redundancy code for error detection.

The MAC header 402 may include a CI field 408 indicating whether the CRC 406 is included in the MPDU 400, a CID field 410 including a connection identifier which indicates an association between the base station 102 and the mobile station 104, 106, 108, an EC field 412 indicating whether the payload 404 is encrypted, an EKS field 414 including an encryption key sequence which may include an index of a traffic encryption key and initialization vector used to encrypt the payload 404, an HCS field 416 including a header check sequence used to detect errors in the MAC header 402, an HT field 418 indicating a header type, a LEN field 420 indicating a length of the MPDU, and a type field 422 indicating any subheaders and special payload types present in the payload 404.

Figure 5:
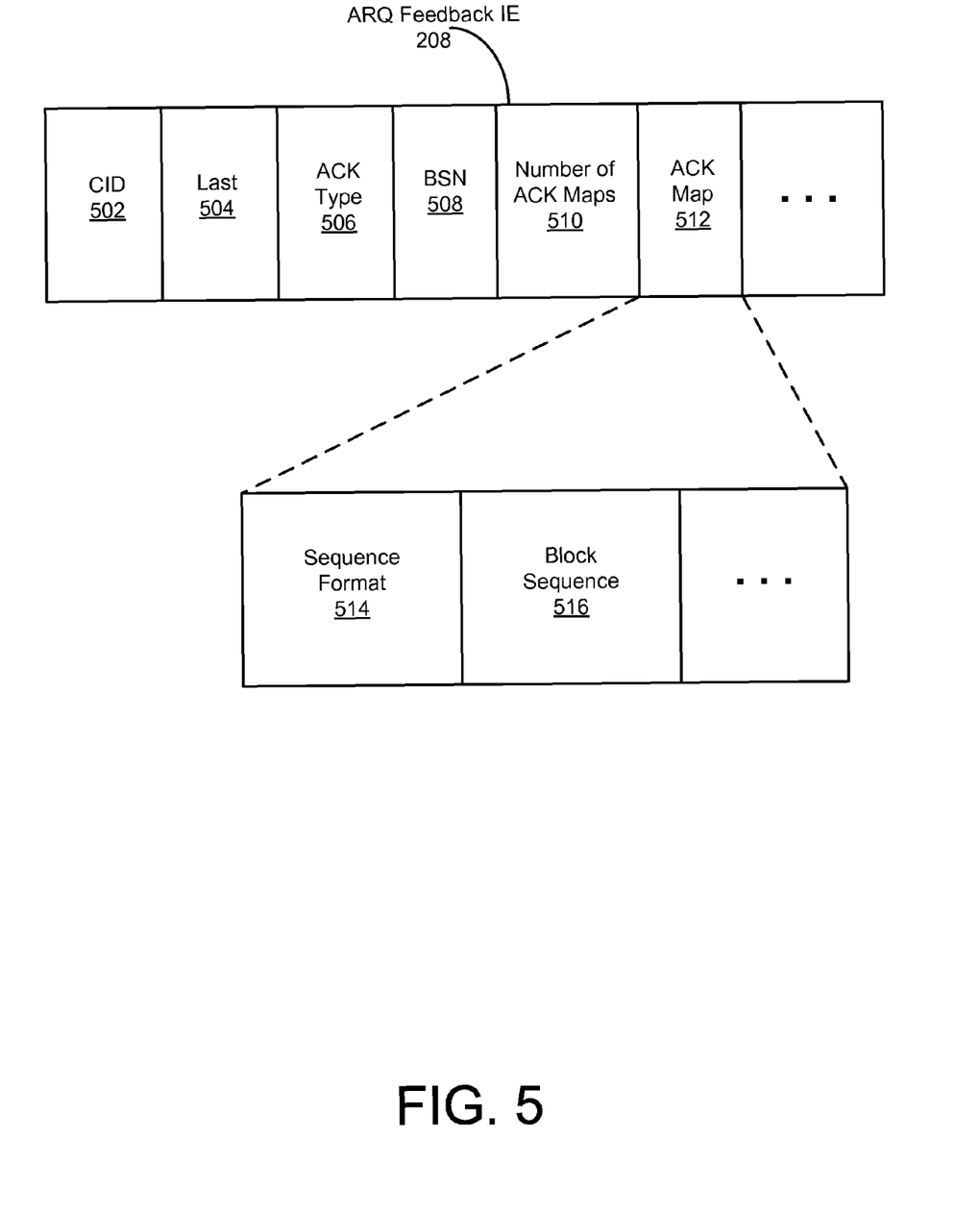
FIG. 5 is a block diagram showing an ARQ feedback IE according to an example embodiment.

FIG. 5 is a block diagram showing an ARQ feedback IE 208 according to an example embodiment. According to this example, the ARQ feedback IE 208 may include a CID field 502 including a connection identifier which indicates a connection between the base station 102 and the mobile station 104, 106, 108. The ARQ feedback IE 208 may also include a last field 504 indicating whether the ARQ feedback IE 208 is the last ARQ feedback IE in a "list" of ARQ feedback ILEs responding to a number of MPDUs 206. The ARQ feedback IE 208 may also include an ACK type field 506.

The ACK type field 506 may, for example, include an acknowledgment type of the ARQ feedback IE 208. For example, the ACK type field 506 may indicate whether the ARQ feedback IE 208 is a selective ACK entry, a cumulative ACK entry, a cumulative with selective ACK entry, a cumulative ACK with block sequence ACK entry, or a cumulative ACK with enhanced block sequence ACK entry.

According to an example embodiment, a 0x3 signal in the ACK type field 506 may indicate that the ARQ feedback IE 208 is either a cumulative ACK with block sequence ACK entry or a cumulative ACK with enhanced block sequence ACK entry. Whether the 0x3 signal in the ACK type field 506 indicates that the ARQ feedback IE 208 is of the former or the latter type may, for example, have been negotiated between the base station 102 and the mobile station 104, 106, 108 during capability negotiation or network entry of the mobile station 104, 106, 108 into the base station's 102 cell.

According to another example, if the ACK type field 506 includes a 0x1 signal, then any signal in a number of ACK maps field 510 (discussed below) other than 0b00 (such as 0b01, 0b10, or 0b11) may indicate that the ARQ feedback IE 208 is a cumulative ACK with enhanced block sequence ACK entry. If the ARQ feedback IE 208 is a cumulative ACK with enhanced block sequence ACK entry, then the ARQ feedback IE 208 may include the number of ACK maps field 510 and a number of ACK map fields 512 (discussed below) indicated by a number included in the number of ACK maps field 510. According to an example embodiment the ARQ feedback IE 208 may not include a sequence acknowledgment map field.

The ARQ feedback IE 208 may also include a BSN field 508. The BSN field 508 may, for example, indicate a block sequence number of the last successfully received MPDU 302.

The ARQ feedback IE 208 may also include the number of ACK maps field 510. The number of ACK maps field 510 may indicate a number of ACK maps 512 included in the ARQ feedback IE 208. According to an example embodiment, the number of ACK maps field 510 may include two bits, and may indicate that either one, two, three, or four ACK map fields 512 are included in the ARQ feedback IE 208.

The ARQ feedback IE 208 may include a number of ACK map fields 512 indicated by the number of ACK maps field 510. Each ACK map field 512 may, for example, include a sequence format field 514 and number of block sequence fields 516. The sequence format field 514 may indicate the number of block sequence fields 516.

Each block sequence field 516 may, for example, indicate a sequence length of successive packets or MPDUs which were successfully received based on the determining which of the plurality of received packets or MPDUs were successfully or not successfully received from the transmitting station 202. For example, a first block sequence field may indicate a sequence length or number of MPDUs in the first block sequence 304 which were not successfully received, a second block sequence field may indicate a sequence length or number of MPDUs in the second block sequence 306 which were successfully received, a third block sequence field may indicate a sequence length or number of MPDUs in the third block sequence 308 which were not successfully received, a fourth block sequence field may indicate a sequence length or number of MPDUs in the fourth block sequence 310 which were successfully received, a fifth block sequence field may indicate a sequence length or number of MPDUs in the fifth block sequence 312 which were not successfully received, a sixth block sequence field may indicate a sequence length or number of MPDUs in the sixth block sequence 314 which were successfully received, a seventh block sequence field may indicate a sequence length or number of MPDUs in the seventh block sequence 316 which were not successfully received, and an eighth block sequence field may indicate a sequence length or number of MPDUs in the eighth block sequence field 318 which were successfully received. While eight block sequence fields corresponding to eight block sequences were used in this example, any number of block sequence fields 516, including the examples described below, corresponding to a number of block sequences may be included in the ARQ feedback IE 208.

According to an example embodiment, the sequence format field 514 may include two bits indicating that the ACK map field 512 includes either two, three, four, or five block sequence fields. In this example, the ARQ feedback IE 208 may include up to fifteen block sequence fields, five for each of the three ACK map fields 512 indicated by the number of ACK maps field 510.

According to an example embodiment, if the indicated number of block sequence fields 516 is two, both block sequence fields 516 may include seven bits. If the indicated number of block sequence fields 516 is three, then three block sequence fields 516 may include five bits, and one block sequence field 516 may include four bits. If the indicated number of block sequence fields 516 is four, then two block sequence fields 516 may include four bits, and two block sequence fields 516 may include three bits. If the indicated number of block sequence fields is five, then two block sequence fields 516 may include five bits, and three block sequence fields 516 may include four bits. This is merely an example. This example may be implemented by the following syntax:

| Syntax | Size (bit) | Notes |
| --- | --- | --- |
| ARQ_Feedback_IE (LAST) { | variable | — |
| CID | 16 | The ID of the connection being referenced |
| LAST | 1 | 0 = More ARQ Feedback IE in the list<br>1 = Last ARQ Feedback IE in the list |
| ACK Type | 2 | 0x0 = Selective ACK entry 0x1 = Cumulative ACK entry<br>0x2 = Cumulative with Selective ACK entry<br>0x3 = Cumulative ACK with Block Sequence Ack entry |
| BSN | 11 | — |
| Number of ACK Maps | 2 | If ACK Type == 01, the field is reserved and set to 00.<br>Otherwise the field indicates the number of ACK maps:<br>0x0 = 1, 0x1 = 2, 0x2 = 3, 0x3= 4 |
| if (ACK Type != 01) { | — | — |
| for (i = 0; i< Number of ACK Maps + 1; ++i) { | — | — |
| if (ACK Type != 3) { | — | — |
| Selective ACK Map | 16 | — |
| } | — | — |
| else { | — | Start of Block Sequence ACK Map definition (16 bits) |
| Sequence Format | 2 | Number of block sequences associated with descriptor<br>0x00: 2 block sequences 0x01: 3 block sequences,<br>0x10: 4 block sequences, 0x11: 5 blocks sequences |
| if (Sequence Format = 0) { | — | — |
| Sequence 1 Length | 7 | — |
| Sequence 2 Length | 7 | — |
| } | — | — |
| else { | — | — |
| Sequence 1 Length | 5 | — |
| Sequence 2 Length | 5 | — |
| Sequence 3 Length | 4 | — |
| } | — | — |
| else { | — | — |
| Sequence 1 Length | 4 | — |
| Sequence 2 Length | 4 | — |
| Sequence 3 Length | 3 | — |
| Sequence 4 Length | 3 | — |
| } | — | — |
| else { | — | — |
| Sequence 1 Length | 5 | — |
| Sequence 2 Length | 5 | — |
| Sequence 3 Length | 4 | — |
| Sequence 4 Length | 4 | — |
| Sequence 5 Length | 4 | — |
| } | — | — |
| } | — | End of Block Sequence ACK Map definition |
| } | | |
| } | | |
| } | | |
| } | | |

According to an example embodiment, the sequence format field 514 may include three bits indicating that the ACK map field 512 includes either two, three, four, five, six, seven, eight, or nine block sequence fields. In this example, the ARQ feedback IE 208 may include up to twenty-seven block sequence fields, nine for each of the three ACK map fields 512 indicated by the number of ACK maps field 510.

According to an example embodiment, the ACK map field 512, including the sequence format field 514 which includes three bits, may include an integer number of bytes, such as two, three, four, or five bytes. For example, if the indicated number of block sequence fields is two, then one block sequence field 516 may include seven bits and one block sequence field 516 may include six bits. If the indicated number of block sequence fields 516 is three, one block sequence field 516 may include five bits, and two block sequence fields 516 may include four bits. If the indicated number of block sequence fields 516 is four, one block sequence field 516 may include four bits and three block sequence fields 516 may include three bits. If the indicated number of block sequence fields 516 is five, one block sequence field 516 may include five bits and four block sequence fields 516 may include four bits. If the indicated number of block sequence fields 516 is six, five block sequence fields 516 may include five bits and one block sequence field 516 may include four bits. If the indicated number of block sequence fields 516 is seven, one block sequence field 516 may include five bits and six block sequence fields 516 may include four bits. If the indicated number of block sequence fields 516 is eight, five block sequence fields 516 may include five bits and three block sequence fields 516 may include four bits. If the indicated number of block sequence fields 516 is nine, one block sequence field 516 may include five bits and eight block sequence fields 516 may include four bits. This is merely an example. This example may be implemented by the following syntax:

| Syntax | Size (bit) | Notes |
|---|---|---|
| ARQ_Feedback_IE (LAST) { | variable | — |
| CID | 16 | The ID of the connection being referenced |
| LAST | 1 | 0 = More ARQ Feedback IE in the list<br>1 = Last ARQ Feedback IE in the list |
| ACK Type | 2 | 0x0 = Selective ACK entry 0x1 = Cumulative ACK entry<br>0x2 = Cumulative with Selective ACK entry<br>0x3 = Cumulative ACK with Block Sequence Ack entry |
| BSN | 11 | — |
| Number of ACK Maps | 2 | If ACK Type == 01, the field is reserved and set to 00.<br>Otherwise the field indicates the number of ACK maps:<br>0x0 = 1, 0x1 = 2, 0x2 = 3, 0x3 = 4 |
| if (ACK Type != 01) { | — | — |
| for (i = 0; i< Number of ACK Maps + 1; ++i) { | — | — |
| if (ACK Type != 3) { | — | — |
| Selective ACK Map | 16 | — |
| } | — | — |
| else { | — | Start of Block Sequence ACK Map definition (16 bits) |
| Sequence Format | 3 | Number of block sequences associated with descriptor<br>0x000: 2 block sequences 0x001: 3 block sequences,<br>0x010: 4 block sequences, 0x011: 5 blocks sequences<br>0x100: 6 block sequences 0x101: 7 block sequences,<br>0x110: 8 block sequences, 0x111: 9 blocks sequences |
| if (Sequence Format = 0) { | — | — |
| Sequence 1 Length | 7 | — |
| Sequence 2 Length | 6 | — |
| } | — | — |
| else { | — | — |
| Sequence 1 Length | 5 | — |
| Sequence 2 Length | 4 | — |
| Sequence 3 Length | 4 | — |
| } | — | — |
| else { | — | — |
| Sequence 1 Length | 4 | — |
| Sequence 2 Length | 3 | — |
| Sequence 3 Length | 3 | — |
| Sequence 4 Length | 3 | — |
| } | — | — |
| else { | — | — |
| Sequence 1 Length | 5 | — |
| Sequence 2 Length | 4 | — |
| Sequence 3 Length | 4 | — |
| Sequence 4 Length | 4 | — |
| Sequence 5 Length | 4 | — |
| } | — | — |
| else { | — | — |
| Sequence 1 Length | 5 | — |
| Sequence 2 Length | 5 | — |
| Sequence 3 Length | 5 | — |
| Sequence 4 Length | 5 | — |
| Sequence 5 Length | 5 | — |
| Sequence 6 Length | 4 | — |
| } | — | — |
| else { | — | — |
| Sequence 1 Length | 5 | — |
| Sequence 2 Length | 4 | — |
| Sequence 3 Length | 4 | — |
| Sequence 4 Length | 4 | — |
| Sequence 5 Length | 4 | — |
| Sequence 6 Length | 4 | — |
| Sequence 7 Length | 4 | — |
| } | — | — |
| else { | — | — |

-continued

| Syntax | Size (bit) | Notes |
|---|---|---|
| Sequence 1 Length | 5 | — |
| Sequence 2 Length | 5 | — |
| Sequence 3 Length | 5 | — |
| Sequence 4 Length | 5 | — |
| Sequence 5 Length | 5 | — |
| Sequence 6 Length | 4 | — |
| Sequence 7 Length | 4 | — |
| Sequence 8 Length | 4 | — |
| } | — | — |
| else { | — | — |
| Sequence 1 Length | 5 | — |
| Sequence 2 Length | 4 | — |
| Sequence 3 Length | 4 | — |
| Sequence 4 Length | 4 | — |
| Sequence 5 Length | 4 | — |
| Sequence 6 Length | 4 | — |
| Sequence 7 Length | 4 | — |
| Sequence 8 Length | 4 | — |
| Sequence 9 Length | 4 | — |
| } | — | — |
| } | — | End of Block Sequence ACK Map definition |
| } | | |
| } | | |
| } | | |

Another example embodiment may be implemented by the ACK type field 506 including a 0x1 signal and the number of ACK maps field 510 indicating a number other than 0b00, such as 0b01, 0b10, or 0b11, which may indicate one, two, or three ACK map fields 512, respectively, according to an example embodiment. In this example, the sequence format field 514 may include two bits indicating that the ACK map field 512 includes either two, three, four, or five block sequence fields. In this example, the ARQ feedback IE 208 may include up to fifteen block sequence fields, five for each of the three ACK map fields 512 indicated by the number of ACK maps field 510.

According to an example embodiment, if the indicated number of block sequence fields 516 is two, both block sequence fields 516 may include seven bits. If the indicated number of block sequence fields 516 is three, then three block sequence fields 516 may include five bits, and one block sequence field 516 may include four bits. If the indicated number of block sequence fields 516 is four, then two block sequence fields 516 may include four bits, and two block sequence fields 516 may include three bits. If the indicated number of block sequence fields is five, then two block sequence fields 516 may include five bits, and three block sequence fields 516 may include four bits. This is merely an example. This example may be implemented by the following syntax:

| Syntax | Size (bit) | Notes |
|---|---|---|
| ARQ_Feedback_IE (LAST) { | variable | — |
| CID | 16 | The ID of the connection being referenced |
| LAST | 1 | 0 = More ARQ Feedback IE in the list 1 = Last ARQ Feedback IE in the list |
| ACK Type | 2 | 0x0 = Selective ACK entry<br>0x1 = Cumulative ACK entry or Enhanced Cumulative ACK with Block Sequence Ack entry<br>0x2 = Cumulative with Selective ACK entry<br>0x3 = Cumulative ACK with Block Sequence Ack entry |
| BSN | 11 | — |
| Number of ACK Maps | 2 | If ACK Type == 01, this field indicates the number of ACK Maps. 0x0=Cumulative ACK entry method is used.(no ACK MAP), 0x1,0x2,0x3 indicate "Cumulative ACK entry with Enhanced Block sequence ACK entry" is used. 0x1=1 ACK MAP, 0x2=2, 0x3=3.<br>If ACK Type !=01, the field indicates the number of ACK maps: 0x0 = 1, 0x1 = 2, 0x2 = 3, 0x3= 4 |
| if (ACK Type != 01) { | — | — |
| for (i = 0; i< Number of ACK Maps + 1; ++i) { | — | — |
| if (ACK Type != 3) { | — | — |
| Selective ACK Map | 16 | — |
| } | — | — |
| else { | — | Start of Block Sequence ACK Map definition (16 bits) |

-continued

| Syntax | Size (bit) | Notes |
|---|---|---|
| Sequence Format | 1 | Number of block sequences associated with descriptor0:<br>2 block sequences 1: 3 block sequences |
| if (Sequence Format = 0) { | — | — |
| Sequence ACK Map | 2 | — |
| Sequence 1 Length | 6 | — |
| Sequence 2 Length | 6 | — |
| Reserved | 1 | — |
| } | — | — |
| else { | — | — |
| Sequence ACK Map | 3 | — |
| Sequence 1 Length | 4 | — |
| Sequence 2 Length | 4 | — |
| Sequence 3 Length | 4 | — |
| } | | |
| } | | |
| } | | |
| } | | |
| else {<br>For(i= 0; i < Number of ACK Maps; ++i) { | — | if (ACK Type==01) |
| Sequence Format | 2 | Number of block sequences associated with descriptor<br>0x00: 2 block sequences 0x01: 3 block sequences,<br>0x10: 4 block sequences, 0x11: 5 blocks sequences |
| if (Sequence Format = 0) { | — | — |
| Sequence 1 Length | 7 | — |
| Sequence 2 Length | 7 | — |
| } | — | — |
| else { | — | — |
| Sequence 1 Length | 5 | — |
| Sequence 2 Length | 5 | — |
| Sequence 3 Length | 4 | — |
| } | — | — |
| else { | — | — |
| Sequence 1 Length | 4 | — |
| Sequence 2 Length | 4 | — |
| Sequence 3 Length | 3 | — |
| Sequence 4 Length | 3 | — |
| } | — | — |
| else { | — | — |
| Sequence 1 Length | 5 | — |
| Sequence 2 Length | 5 | — |
| Sequence 3 Length | 4 | — |
| Sequence 4 Length | 4 | — |
| Sequence 5 Length | 4 | — |
| } | | |
| } | — | End of Block Sequence ACK Map definition |
| } | | |
| } | | |
| } | | |

The sequence format field 514 may also include three bits, and be implemented by the following syntax:

| Syntax | Size (bit) | Notes |
|---|---|---|
| ARQ_Feedback_IE (LAST) { | variable | — |
| CID | 16 | The ID of the connection being referenced |
| LAST | 1 | 0 = More ARQ Feedback IE in the list 1 = Last ARQ Feedback IE in the list |
| ACK Type | 2 | 0x0 = Selective ACK entry<br>0x1 = Cumulative ACK entry or Enhanced Cumulative ACK with Block Sequence Ack entry<br>0x2 = Cumulative with Selective ACK entry<br>0x3 = Cumulative ACK with Block Sequence Ack entry |
| BSN | 11 | — |
| Number of ACK Maps | 2 | If ACK Type == 01, this field indicates the number of ACK Maps. 0x0=Cumulative ACK entry method is used.(no ACK MAP), 0x1,0x2,0x3 indicate "Cumulative ACK entry with Enhanced |

-continued

| Syntax | Size (bit) | Notes |
|---|---|---|
| | | Block sequence ACK entry" is used. 0x1=1 ACK MAP, 0x2=2, 0x3=3.<br>If ACK Type !=01, the field indicates the number of ACK maps: 0x0 = 1, 0x1 = 2, 0x2 = 3, 0x3= 4 |
| if (ACK Type != 01) { | — | — |
| for (i = 0; i< Number of ACK Maps + 1; ++i) { | — | — |
| if (ACK Type != 3) { | — | — |
| Selective ACK Map | 16 | — |
| } | — | — |
| else { | — | Start of Block Sequence ACK Map definition (16 bits) |
| Sequence Format | 1 | Number of block sequences associated with descriptor0:<br>2 block sequences 1: 3 block sequences |
| if (Sequence Format = 0) { | — | — |
| Sequence ACK Map | 2 | — |
| Sequence 1 Length | 6 | — |
| Sequence 2 Length | 6 | — |
| Reserved | 1 | — |
| } | — | — |
| else { | — | — |
| Sequence ACK Map | 3 | — |
| Sequence 1 Length | 4 | — |
| Sequence 2 Length | 4 | — |
| Sequence 3 Length | 4 | — |
| } | — | — |
| } | | |
| } | | |
| } | | |
| else { | — | if (ACK Type==01) |
| For(i= 0; i < Number of ACK Maps; ++i) { | | |
| Sequence Format | 3 | Number of block sequences associated with descriptor<br>0x000: 2 block sequences 0x001: 3 block sequences,<br>0x010: 4 block sequences, 0x011: 5 blocks sequences<br>0x100: 6 block sequences 0x101: 7 block sequences,<br>0x110: 8 block sequences, 0x111: 9 blocks sequences |
| if (Sequence Format = 0) { | — | — |
| Sequence 1 Length | 7 | — |
| Sequence 2 Length | 6 | — |
| } | — | — |
| else { | — | — |
| Sequence 1 Length | 5 | — |
| Sequence 2 Length | 4 | — |
| Sequence 3 Length | 4 | — |
| } | — | — |
| else { | — | — |
| Sequence 1 Length | 4 | — |
| Sequence 2 Length | 3 | — |
| Sequence 3 Length | 3 | — |
| Sequence 4 Length | 3 | — |
| } | — | — |
| else { | — | — |
| Sequence 1 Length | 5 | — |
| Sequence 2 Length | 4 | — |
| Sequence 3 Length | 4 | — |
| Sequence 4 Length | 4 | — |
| Sequence 5 Length | 4 | — |
| } | — | — |
| else { | | |
| Sequence 1 Length | 5 | — |
| Sequence 2 Length | 5 | — |
| Sequence 3 Length | 5 | — |
| Sequence 4 Length | 5 | — |
| Sequence 5 Length | 5 | — |
| Sequence 6 Length | 4 | — |
| } | — | — |
| else { | | |
| Sequence 1 Length | 5 | — |
| Sequence 2 Length | 4 | — |
| Sequence 3 Length | 4 | — |
| Sequence 4 Length | 4 | — |
| Sequence 5 Length | 4 | — |

-continued

| Syntax | Size (bit) | Notes |
|---|---|---|
| Sequence 6 Length | 4 | — |
| Sequence 7 Length | 4 | — |
| } | — | — |
| else { | — | — |
| Sequence 1 Length | 5 | — |
| Sequence 2 Length | 5 | — |
| Sequence 3 Length | 5 | — |
| Sequence 4 Length | 5 | — |
| Sequence 5 Length | 5 | — |
| Sequence 6 Length | 4 | — |
| Sequence 7 Length | 4 | — |
| Sequence 8 Length | 4 | — |
| } | — | — |
| else { | — | — |
| Sequence 1 Length | 5 | — |
| Sequence 2 Length | 4 | — |
| Sequence 3 Length | 4 | — |
| Sequence 4 Length | 4 | — |
| Sequence 5 Length | 4 | — |
| Sequence 6 Length | 4 | — |
| Sequence 7 Length | 4 | — |
| Sequence 8 Length | 4 | — |
| Sequence 9 Length | 4 | — |
| } | — | — |
| } | — | End of Block Sequence ACK Map definition |
| } | | |
| } | | |

According to another example, the sequence format field 514 may include one bit indicating either two or three block sequence fields 516. In this example, the acknowledgment map field(s) 512 may not include a sequence acknowledgment map field.

By not allocating any bits to a sequence acknowledgment field (not shown) in the acknowledgment map field 512 according to the examples described above, more bits may be allocated to block sequence number fields 516, allowing the ARQ feedback IE 208 to report longer block sequences or more block sequences within the same ARQ feedback IE 208.

Figure 6:
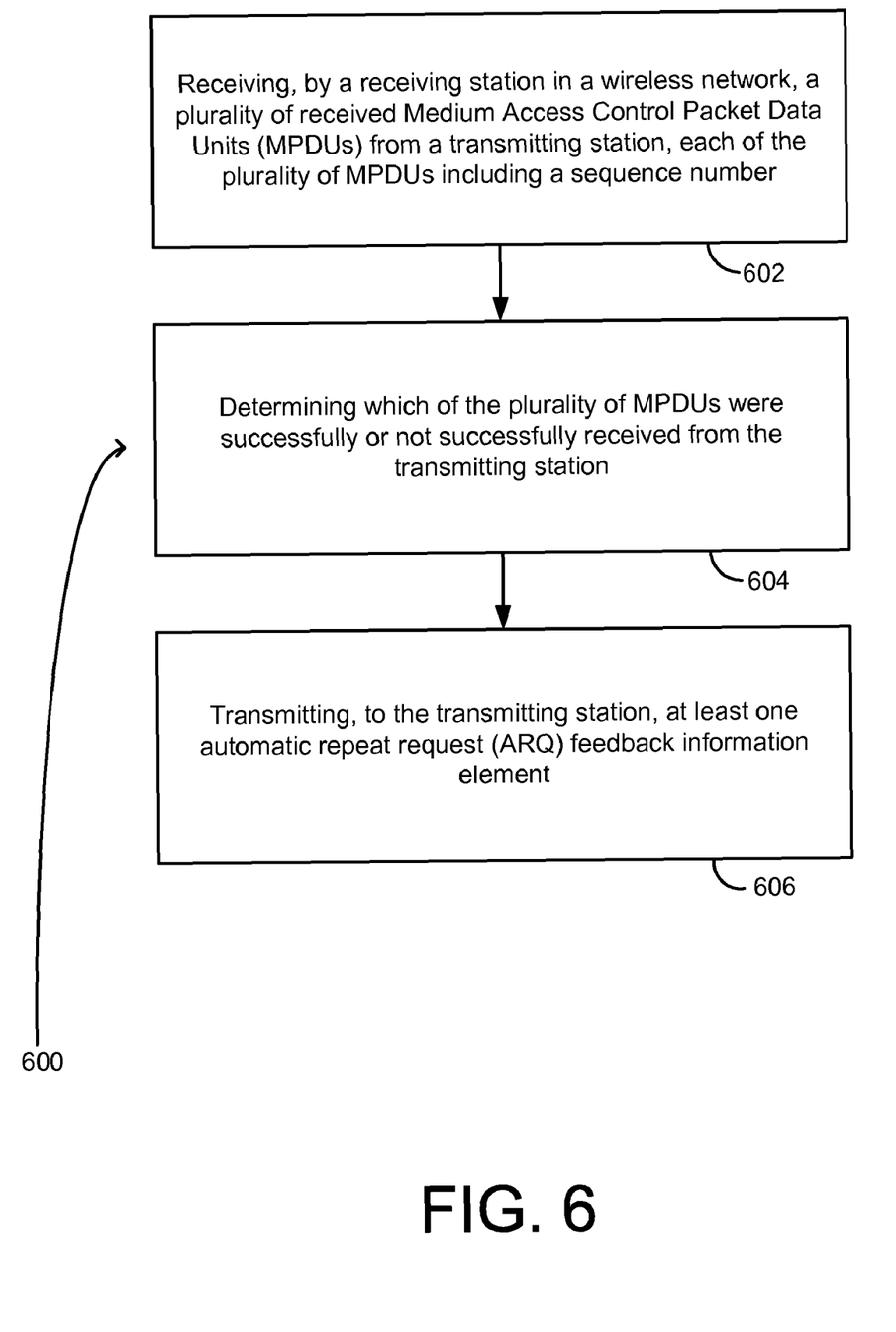
FIG. 6 is a flowchart showing a method according to an example embodiment.

FIG. 6 is a flowchart showing a method 600 according to an example embodiment. In this example, the method 600 may include receiving, by a receiving station in a wireless network, a plurality of received Medium Access Control Packet Data Units (MPDUs) from a transmitting station, each of the plurality of received MPDUs including a sequence number (602). The method 600 may also include determining which of the plurality of received MPDUs were successfully or not successfully received from the transmitting station (604). The method 600 may also include transmitting, to the transmitting station, at least one automatic repeat request (ARQ) feedback information element (IE) (606). The at least one ARQ feedback IE may include a number of acknowledgment maps field indicating a number of acknowledgment maps included in the ARQ feedback IE, and the indicated number of acknowledgment maps. Each of the acknowledgment maps may include a sequence format field indicating a number of block sequence fields, and the indicated number of block sequence fields. Each of the block sequence fields may indicate a sequence length of successive packets which were successfully or not successfully received based on the determining which of the plurality of received MPDUs were successfully or not successfully received from the transmitting station.

In an example embodiment, the at least one feedback IE may also include an acknowledgment type field indicating a type of the ARQ feedback IE as either a cumulative acknowledgment entry or a cumulative acknowledgment with enhanced block sequence acknowledgment entry. In this example, the number of acknowledgment maps field may also indicate the type of the ARQ feedback IE as the cumulative acknowledgment with enhanced block sequence acknowledgment entry.

In an example embodiment, the sequence format field may include a one-bit sequence format field indicating the number of block sequence fields.

In an example embodiment, the sequence format field may include a two-bit sequence format field indicating the number of block sequence fields.

In an example embodiment, the sequence format field may include a three-bit sequence format field indicating the number of block sequence fields.

In an example embodiment, a first block sequence field in the number of block sequence fields may indicate a sequence length of successive packets which were not successfully received, and block sequence fields following the first block sequence field may alternately indicate successfully and not successfully received packets based on the determining which of the plurality of received MPDUs were successfully or not successfully received from the transmitting station.

In an example embodiment, the acknowledgment maps may not include a sequence acknowledgment map field.

In an example embodiment, the at least one ARQ feedback IE may further include a connection identifier (CID) field identifying a connection between the receiving station and the transmitting station.

In an example embodiment, the at least one ARQ feedback IE may further include a last field indicating whether the ARQ feedback IE is a last ARQ feedback IE in the at least one transmitted ARQ feedback IE.

In an example embodiment, the at least one ARQ feedback IE may further include an acknowledgment type field identifying an acknowledgment type of the ARQ feedback IE.

In an example embodiment, the at least one ARQ feedback IE may further include an acknowledgment type field identifying the ARQ feedback IE as a cumulative acknowledgment with enhanced block sequence acknowledgment entry.

In an example embodiment, the at least one ARQ feedback IE may further include a block sequence number indicating the sequence number of a last successfully received MPDU before a first unsuccessfully received MPDU.

In an example embodiment, the at least one ARQ feedback IE may further include a block sequence number indicating the sequence number of a last MPDU and all the MPDUs before the last MPDU in a first sequence of successfully received packets.

In an example embodiment, the ARQ feedback IE may be included a transmitted MPDU.

In an example embodiment, the transmitting the at least one ARQ feedback IE may include transmitting the at least one ARQ feedback IE at a carrier frequency of about 2.5 Gigahertz.

In an example embodiment, the transmitting the at least one ARQ feedback IE may include transmitting the at least one ARQ feedback IE at a carrier frequency of about 3.5 Gigahertz.

In an example embodiment, the transmitting the at least one ARQ feedback IE may include transmitting the at least one ARQ feedback IE using orthogonal frequency division multiplexing (OFDM).

In an example embodiment, the indicated number of block sequences indicated by the sequence format field may be based on the determining which of the plurality of received MPDUs were successfully received from the transmitting station.

Figure 7:
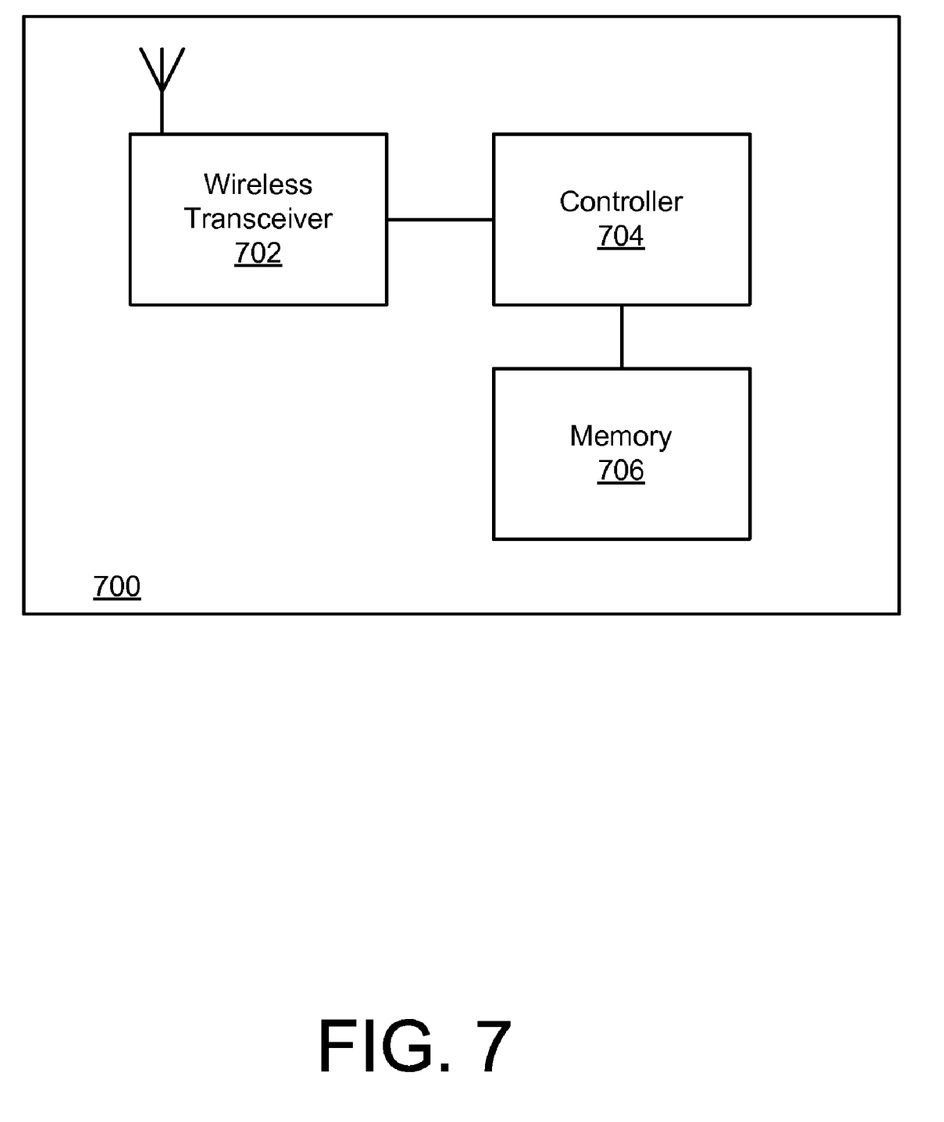
FIG. 7 is a block diagram showing an apparatus according to an example embodiment.

FIG. 7 is a block diagram showing an apparatus 700 according to an example embodiment. The apparatus (e.g. base station 104 or mobile node 106, 108, 110) may include, for example, a wireless transceiver 702 to transmit and receive signals, a controller 704 to control operation of the station and execute instructions or software, and a memory 706 to store data and/or instructions.

Controller 704 may be programmable and capable of executing software or other instructions stored in memory or on other computer media to perform the various tasks and functions described above, such as one or more of the tasks or methods described above.

In addition, a storage medium may be provided that includes stored instructions, when executed by a controller or processor that may result in the controller 704, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
receiving, by a receiving station in a wireless network, a plurality of received Medium Access Control Packet Data Units (MPDUs) from a transmitting station, each of the plurality of received MPDUs including a sequence number;
determining which of the plurality of received MPDUs were successfully or not successfully received from the transmitting station; and transmitting, to the transmitting station, at least one automatic repeat request (ARQ) feedback information element (IE), the at least one ARQ feedback IE including:
a number of acknowledgment maps field indicating a number of acknowledgment maps included in the ARQ feedback IE; and
the indicated number of acknowledgment maps, each of the acknowledgment maps including:
a sequence format field indicating a number of block sequence fields; and
the indicated number of block sequence fields, each of the block sequence fields indicating a sequence length of successive packets which were successfully or not successfully received based on the determining which of the plurality of received MPDUs were successfully or not successfully received from the transmitting station.

2. The method of claim 1, wherein the sequence format field includes a one-bit sequence format field indicating the number of block sequence fields.

3. The method of claim 1, wherein the sequence format field includes a two-bit sequence format field indicating the number of block sequence fields.

4. The method of claim 1, wherein the sequence format field includes a three-bit sequence format field indicating the number of block sequence fields.

5. The method of claim 1, wherein a first block sequence field in the number of block sequence fields indicates a sequence length of successive packets which were not successfully received, and block sequence fields following the first block sequence field alternately indicate successfully and not successfully received packets based on the determining which of the plurality of received MPDUs were successfully or not successfully received from the transmitting station.

6. The method of claim 1, wherein the acknowledgment maps do not include a sequence acknowledgment map field.

7. The method of claim 1, wherein the at least one ARQ feedback IE further includes a connection identifier (CID) field identifying a connection between the receiving station and the transmitting station.

8. The method of claim 1, wherein the at least one ARQ feedback IE further includes a last field indicating whether the ARQ feedback IE is a last ARQ feedback IE in the at least one transmitted ARQ feedback IE.

9. The method of claim 1, wherein the at least one ARQ feedback IE further includes an acknowledgment type field identifying an acknowledgment type of the ARQ feedback IE.

10. The method of claim 1, wherein the at least one ARQ feedback IE further includes an acknowledgment type field identifying the ARQ feedback IE as a cumulative acknowledgment with enhanced block sequence acknowledgment entry.

11. The method of claim 1, wherein the at least one ARQ feedback IE further includes a block sequence number indicating the sequence number of a last successfully received MPDU before a first unsuccessfully received MPDU.

12. The method of claim 1, wherein the at least one ARQ feedback IE further includes a block sequence number indicating the sequence number of a last MPDU and all the MPDUs before the last MPDU in a first sequence of successfully received packets.

13. The method of claim 1, wherein the ARQ feedback IE is included a transmitted MPDU.

14. The method of claim 1, wherein the transmitting the at least one ARQ feedback IE includes transmitting the at least one ARQ feedback IE at a carrier frequency of about 2.5 Gigahertz.

15. The method of claim 1, wherein the transmitting the at least one ARQ feedback IE includes transmitting the at least one ARQ feedback IE at a carrier frequency of about 3.5 Gigahertz.

16. The method of claim 1, wherein the transmitting the at least one ARQ feedback IE includes transmitting the at least one ARQ feedback IE using orthogonal frequency division multiplexing (OFDM).

17. The method of claim 1, wherein the indicated number of block sequences indicated by the sequence format field is based on the determining which of the plurality of received MPDUs were successfully received from the transmitting station.

18. A method comprising:
receiving, by a receiving station in a wireless network, a plurality of received Medium Access Control Packet Data Units (MPDUs) from a transmitting station, each of the plurality of MPDUs including a sequence number;
determining which of the plurality of received MPDUs were successfully or not successfully received from the transmitting station; and
transmitting, to the transmitting station, at least one automatic repeat request (ARQ) feedback information element (IE), the at least one ARQ feedback IE including:
an acknowledgment type field indicating a type of the ARQ feedback IE as either a cumulative acknowledgment entry or a cumulative acknowledgment with enhanced block sequence acknowledgment entry;
a number of acknowledgment maps field indicating the type of the ARQ feedback IE as the cumulative acknowledgment with enhanced block sequence acknowledgment entry, and further indicating a number of acknowledgment maps included in the ARQ feedback IE; and
the indicated number of acknowledgment maps, each of the acknowledgment maps including:
a two-bit sequence format field indicating a number of block sequence fields; and
the indicated number of block sequence fields, each of the block sequence fields indicating a sequence length of successive packets which were successfully or not successfully received based on the determining which of the plurality of received MPDUs were successfully or not successfully received from the transmitting station.

19. The method of claim 18, wherein a first block sequence field from the number of block sequence fields indicates a sequence length of successive packets which were not successfully received, and following block sequence fields alternately indicate successfully and not successfully received based on the determining which of the plurality of received MPDUs were successfully or not successfully received from the transmitting station.

20. The method of claim 18, wherein the acknowledgment maps do not include a sequence acknowledgment map field.

* * * * *